July 15, 1969     W. T. RENTSCHLER ET AL     3,456,101
FLASH GUN FOR EXPENDABLE FLASH BULBS
Filed March 15, 1967     3 Sheets-Sheet 1
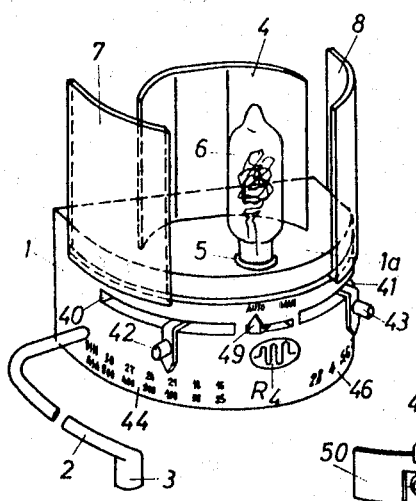
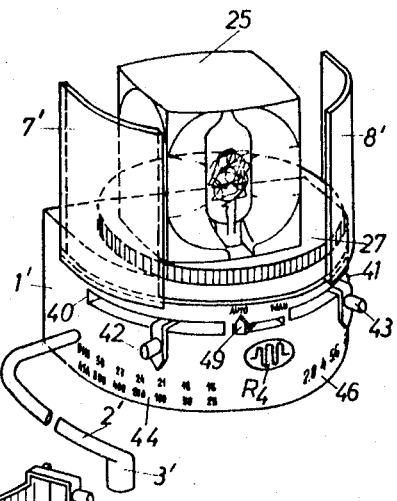
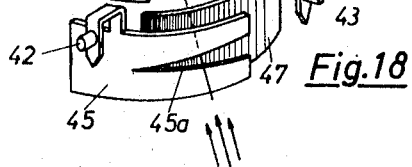
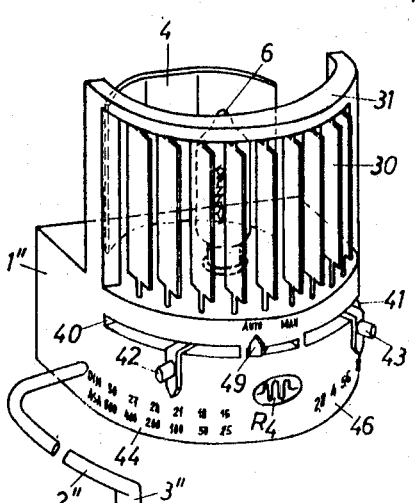
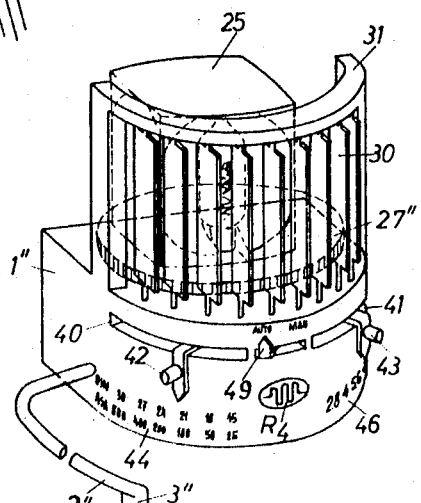
INVENTORS
Waldemar T. Rentschler
Franz W. R. Starp

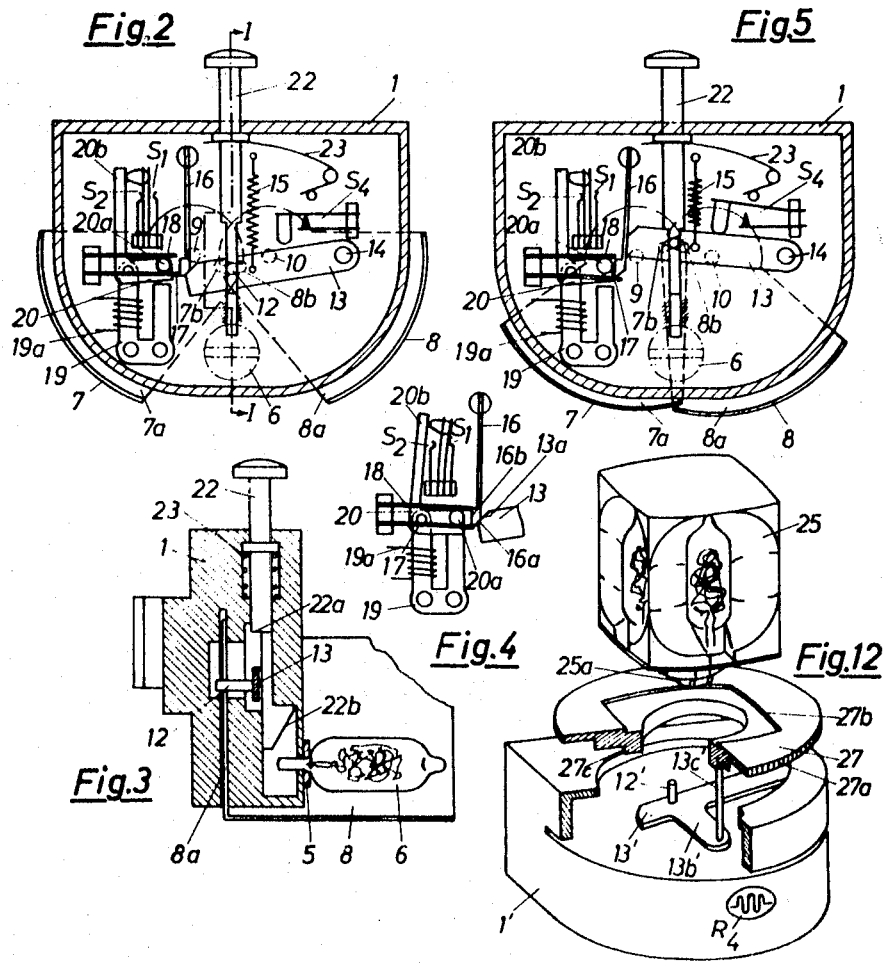
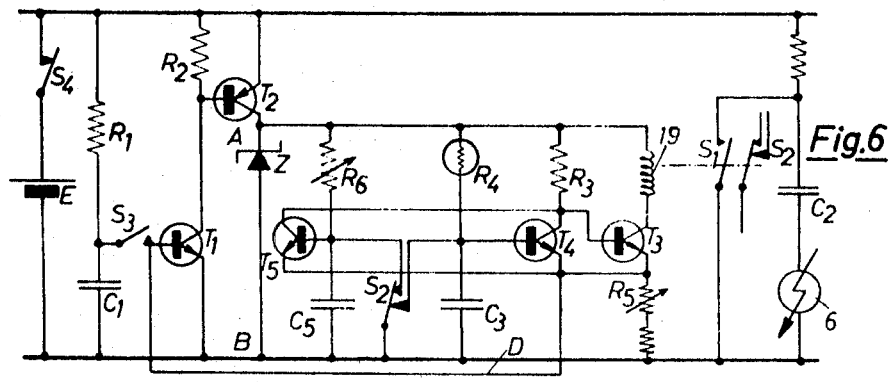

July 15, 1969  W. T. RENTSCHLER ET AL  3,456,101
FLASH GUN FOR EXPENDABLE FLASH BULBS
Filed March 15, 1967  3 Sheets-Sheet 3
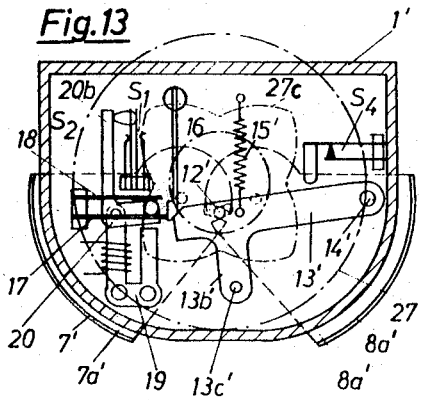
Fig.13
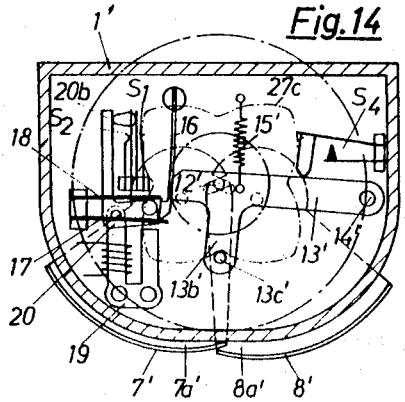
Fig.14
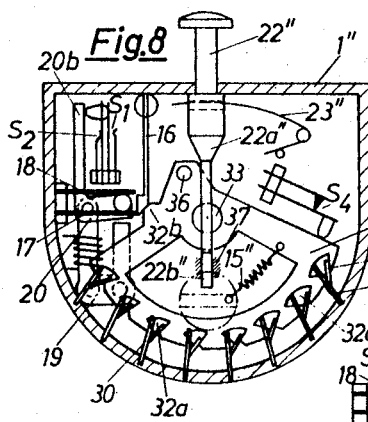
Fig.8
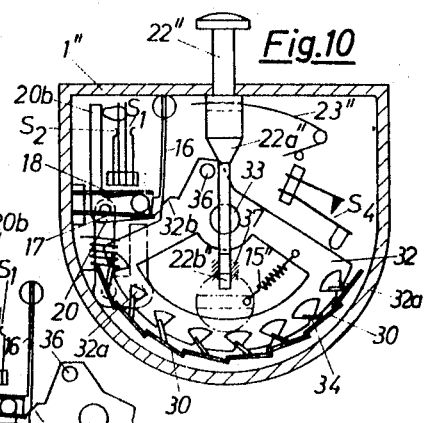
Fig.10
Fig.9
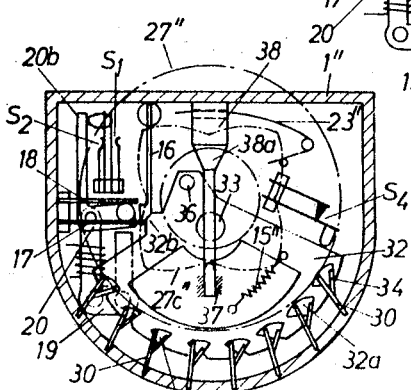
Fig.16
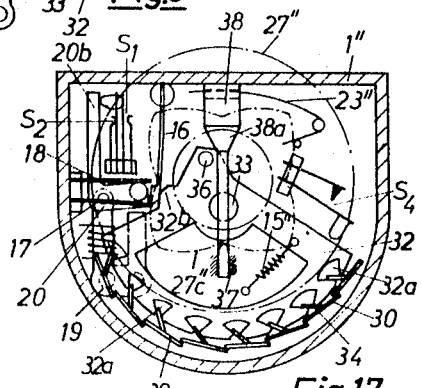
Fig.17
INVENTORS
Waldemar T. Rentschler
Franz W. R. Starp

United States Patent Office

3,456,101
Patented July 15, 1969

3,456,101
FLASH GUN FOR EXPENDABLE FLASH BULBS
Waldemar T. Rentschler and Franz W. R. Starp, Calmbach, Germany, assignors to Prontor-Werk Alfred Gauthier G.m.b.H., Calmbach, Black Forest, Germany, a corporation of Germany
Filed Mar. 15, 1967, Ser. No. 623,310
Claims priority, application Germany, Mar. 18, 1966, P 39,006
Int. Cl. G03b 15/05
U.S. Cl. 240—1.3                17 Claims

ABSTRACT OF THE DISCLOSURE

A gun for photographic flashbulbs, to be fixed to a camera, having film speed and aperture setting members which, prior to an exposure, are set to the approximate values. Cocking the gun opens flaps in front of the flash bulb, and on depression of the shutter release the flashbulb is fired. Thereafter a timing circuit controlled by a photo-electric resistor which receives light reflected from the subject, determines a time after which the flaps close and shut off the remainder of the flash bulb light emission from the subject.

---

The invention concerns a flash gun device for expendable flash bulbs for carrying out exposures in artificial light with a photographic camera.

In all hitherto known flash devices which are equipped for the use of such flash bulbs the complete light quantity available from the type of bulb chosen is always of a predetermined unalterable amount. The correct exposure of the sensitized material has consequently to be effected by the photographer, so that he adjusts the lens diaphragm of the camera according to the known guide number equation $$\frac{\text{guide number}}{\text{range}} = \text{diaphragm aperture}$$

Proposals have in fact already become known according to which the guide number value is taken into account by suitable coupling between the diaphragm setting member and range setting member which incorporates means for compensating for different adjusting characteristics. It is however still necessary, when changing over from daylight to flash photography, for corresponding transition adjustments to be carried out. Moreover the correct exposure of the film material is still dependent upon the range setting of the camera.

In electronic flash devices it has already been proposed to ensure correct exposure of the film material by arranging that the period of lighting of the flash tube is terminated when the lens has received the required quantity of light by the use of an electronic circuit provided with a photo-resistor. This step is restricted to the use of complex and therefore relatively costly electronic flash guns and cannot be transferred to simple conventional flash guns for expendable flash bulbs, since in these guns there is no possibility of controlling light emission once the flash bulb is ignited.

The object of the present invention is to improve and perfect flash guns for expendable flash bulbs to obviate adjustment operations which were necessary on the camera hitherto for making flash exposures whilst ensuring that the object to be photographed during flash does not receive more than the quantity of light that is necessary for maximum adequate illumination. The object is achieved by the provision of simple electronic and structural elements which can be fitted and sold separately from the camera.

This problem is solved in accordance with the invention by the fact that the flashbulb has associated therewith a light screen adapted to be actuated by means of a driving device and mounted in front of a flash bulb, which screen at the beginning of the ignition of the bulb assumes an open position permitting a direct incidence of light on the object, the driving device being so controlled by an electronic switching device including a photoelectric resistor in its circuit, that the screen after a certain time interval is caused to change over from an open to a closed position in dependence on the intensity of the illumination reflected from the object and acting on the photoelectric resistor. Hence with relatively simple structural means and by the use of a separate vendible electric component, a flash gun assembly is provided by means of which premature automatic interruption of the light irradiation of the subject by a flashbulb is obtainable before completion of its full period of illumination. This arrangement eliminates cumbersome adjusting procedures when making artificial light exposures, without the photographer running the risk of turning out badly exposed photographs.

A particularly simple structure and a functionally reliable mode of operation of the flash gun are ensured by the fact that the light shield is moved from an open position to a closed position by means of a driving member tensioned against the action of a spring and retained in this state by means of an electromagnetically actuated catch. In a further development of the invention the driving member serving to move the light screen may be formed as a rotatably mounted lever, thus providing interference-free operation and simple manipulation.

In an embodiment of the flash gun in accordance with the invention the light screen is formed of two oppositely displaceable flaps in driving engagement with the driving lever. Provision is further made for each of the flaps to be arranged on a segment rotatably mounted on a pin; each such segment is in pin and slot conection with the driving lever and each flap has a curvature adapted to the path of movement.

According to a further feature of the invention it is possible to use a plurality of blades arranged in louvre-form and rotatably mounted. This is more especially useful only relatively low closing forces are available to bring about a rapid change of the blades from the open state to the closed state. A convenient embodiment in accordance with this latter embodiment of the invention is that the blades of the light screen are arranged in an arc, and that the driving lever causing them to rotate is formed as a cocking segment and provided with an arcuate camplate corresponding in shape to the location of the blades, which camplate has a plurality of sector-like recesses corresponding to the number of blades, each recess being operatively in engagement with a strap pin or the like leading laterally from each blade.

To obtain a simple method of operation of the flash gun provision is further made that an actuating member is used for transferring the lever serving to drive the light screen into the cocked position, the said member simultaneously acting as a lamp ejector. In this way the photograper need only operate the actuating member after a flash exposure and subsequently thereto insert a new flashbulb into the holder of the flash gun.

In order to enable the apparatus according to the invention to be used in connection with a flash gun for multi-flash exposures, for example, a flash cube having four flashbulbs to be set off successively, it is proposed in a further development of the invention for the flash gun to be equipped with a rotatably mounted switch plate serving to receive the flash cube and manually actuated, which plate has a switching cam engaging with the driving lever of the light screen and during the switching operation automatically transfers the driving lever into the cocked position. In order to ensure a constant satisfactory action of the flash gun the invention provides for the shape of the switching cam to be made according to the number of switching operations required during a complete turn of the switching plate, and to be provided with a plurality of lifting cams extendable radially outwards from the pivot of the switching plate and back again.

To enable the photographer, when taking photographs, to take the exposure factors such as aperture and film sensitivity setup on the camera into account on the flash gun, it is further proposed in accordance with the invention to associate with the photoelectric resistor a regulatable device to reduce the light reaching the said resistor, the device being fitted in a window of the housing. The light reducing means may be a grey wedge or a variable width slit diaphragm, the means being adjustable by manual setting members.

In accordance with a further feature of the invention a locking device retaining the driving lever of the light screen in a cocked position is formed as a stepped locking device which is released in two successive switching stages by the armature of an electromagnet connected in circuit with the electronic switching device, the stages corresponding to the attraction and release of the armature. In an addition to this arrangement the invention provides for a double switch to be located in the movement range of the magnet armature or a part movable therewith, which switch, when the armature is attracted, initiates both the charging of the capacitor determining the duration of illumination, and the firing of the flashbulb.

Since it is possible that the photographer may wish to take artificial light photographs independently of the control of the photoelectric resistor, the invention provides an additional switching stage formed of RC-networks and a transistor in the circuit of the electronic switching device which positively releases the electromagnetically actuable locking device. This is for the purpose of returning the flash gun to the same rest position. A further advantageous embodiment may be effected by providing a selector adapted to be set to "AUTO" or "MANUAL," by means of which the control of the photoelectric resistor is switched off in the latter position.

To permit flashes to be made to produce deliberate over or under exposures of certain objects, the invention provides a slider connected with the selector which covers the photoelectric resistor in the setting position "MAN." This arrangement permits the use of the apparatus in accordance with the invention for night exposures in the open, in which certain near objects or persons must be correctly illuminated. This is otherwise only possible by calculation and manual setting of the aperture value.

Details of the invention are shown in the following description and the accompanying drawings, which show several embodiments and examples of application of the subject matter of the invention:

In the drawings,

FIG. 1 is an embodiment of a flash gun fitted with a single flashbulb, the light screen of which is formed of two opposing flaps, FIG. 2 is a horizontal section through the housing of the flash gun, showing the driving mechanism used for moving the light screen with the latter open, FIG. 3 is a longitudinal section through the housing of the flash gun on the sectional line I—I of FIG. 2, FIG. 4 is a fragmentary view of the electro-magnetic lock for locking the driving mechanism after it has reached an intermediate position, FIG. 5 is a horizontal section through the gun showing the light screen in a closed position, FIG. 6 is a circuit of the electronic switching device of the flash gun, FIG. 7 is an alternative embodiment of the flash gun, the light screen of which is formed by several louvre-like blades, FIG. 8 is a horizontal section through the flash gun as shown in FIG. 7 with the driving mechanism located with the blades in an open position, FIG. 9 is a fragmentary view of the lock in an intermediate position which locks the driving mechanism with the blades open, FIG. 10 is a horizontal section through the housing of the flash gun as shown in FIGS. 7 and 8, after the driving mechanism has been in action and the blades are closed, FIG. 11 is a flash gun with opposing flaps adapted to receive a multiple flash bulb mounting, FIG. 12 is a fragmentary view of the gun as shown in FIG. 11 showing the arrangement of the switching plate for receiving the flash mounting and transferring the driving mechanism into the cocked position, FIG. 13 is a horizontal section through a flash gun with a pair of flaps in the cocked (open) position, the switching plate and the switching cam provided thereon being indicated by chain-dotted lines.

FIG. 14 is the same view of the flash gun after a flash action, with closed flaps, FIG. 15 is an embodiment of the flash gun as shown in FIG. 7 having louvre blades and equipped for use with a multiple bulb mounting, FIG. 16 is a horizontal section through the device of FIG. 15 with the blades in a cocked (open) position, FIG. 17 is the same view of the device as shown in FIG. 16 after flash action, with closed blades, FIG. 18 is a perspective view of means for reducing or blocking the light rays received by the photo-resistor from the object.

In FIG. 1 the numeral 1 denotes the housing of a flash gun which is either fixedly mounted on a camera, or so fashioned that it may be subsequently fitted to the viewfinder shoe of the camera. The housing of the flash gun, for manufacturing reasons, is preferably of semi-circular cylindrical shape. An electric connection to a synchronous contact usually provided on the shutter, is effected by means of a cable 2 connected to housing 1, on the free end of which a socket connector 3 is provided. This contact, not further shown, has been taken into account in the circuit shown in FIG. 6 and will be described in detail below. On the surface 1a of the flash gun there is a reflector 4 and in the focus thereof a holder 5 to receive a flashbulb 6. Associated with this bulb is a light screen which is formed as shown in the embodiment of FIGS. 1 to 5 of two opposing flaps 7 and 8. The two flaps 7 and 8, as shown in FIG. 2, are secured to segments 7a and 8a which in turn are fixedly and pivotally mounted in the interior of the housing by means of pins 9 and 10. The arrangement is such that the two segments 7a and 8a somewhat overlap, forming slits 7b and 8b. A pin 12 which is secured to a lever 13 formed as driving member for the flaps 7 and 8 engages in these slits. The lever 13 is pivotally mounted on a fixed pin 14. A tension spring 15 acts on the driving lever 13, the tendency of the spring being to turn the lever clockwise. As evident from FIGS. 2, 4 and 5 a stop is associated with the driving lever 13 preventing it from leaving the normal position shown in FIG. 2. A catch spring 16 fixed at one end is used as a stop, the free end of the spring supported against the driving lever 13 having such a chamfer 16a as to prevent a self-locking action. Co-operating with the catch spring 16 are two supporting springs 17 and 18 of varying length mounted at an angle of 90° thereto. The association of the juxtaposed springs 17 and 18 clamped only at one end is such that the catch spring 16 is disengageable from the catch position only in timed movement operations (see FIG. 4).

As also evident from FIGS. 2, 4 and 5 the interior of the housing 1 houses an electro-magnet 19 with a pivoted armature 20. In its rest position the armature 20 is not held against the magnet 19, as the coil 19a therefor is deenergised. The rest position of the armature 20 is retermined by the pin 20a mounted thereon, which is located between spring 17 and 18. An arm extension 20b of the armature 20 has a contact asembly associated therewith, comprising a switch $S_1$ and a further switch $S_2$. The arrangement is such that in the rest position of the armature 20 switch $S_1$ is open and switch $S_2$ closed. In the circuit shown in FIG. 6 the switch $S_2$ is shown twice, both in its switching position in the circuit, and so that its functional dependence upon the electro-magnet 19 is easily seen.

To trip the driving lever 13 when located in the cocked position, it is necessary for the armature 20 to be first attracted by the electro-magnet 19 and subsequently released therefrom. When current passes through the coil 19a of the electro-magnet 19, the armature 20 is attracted, assuming the position as shown in FIG. 4. During this movement the pin 20a displaces the supporting spring 17 so that it finally slips off along the edge 16b of the catch spring 16. Since the pre-tensioned supporting spring 18 follows the pin 20a, the catch spring 16 now rests against the end face of the shorter supporting spring 18. Simultaneously therewith the arm 20b of the armature 20 closes switch $S_1$ and opens switch $S_2$. The effects of these operations are described in detail below individually in connection with the electronic switching device.

As soon as the coil 19a of the electro-magnet 19 is de-energised, the armature 20 releases under the influence of tensioned supporting spring 17. As a result switch $S_1$ opens again, switch $S_2$ being closed. Thus, the pin 20a pushes the supporting spring 17 off the supporting edge 16b of the catch spring 16. Since the supporting spring 17 is prevented from swinging in again due to the preliminary path already covered by the catch spring 16 it is pushed completely to one side. Under the action of the tension spring 15 the driving lever 13 now executes a rotary movement in a clockwise direction about its bearing pin 14, the flaps 7 and 8 of the light screen changing over from the open state to the closed state as shown in FIG. 5.

The switching of the electro-magnet 20 in synchronism with the camera shutter and ignition of the flashbulb 6, is effected by an electronic switching device provided for this purpose, the circuit of which is shown in FIG. 6. In this circuit, $S_3$ denotes the flash contact switch conventionally provided in a camera or a shutter. If a switch with X-synchronisation is concerned, then it is closed just before maximum shutter aperture is reached. If on the other hand a contact with M-synchronisation is concerned, then the contact is colsed some 15 to 17 millisecs before reaching full aperture. Both kinds of contacts may be employed. The exposure time set on the camera must be at most 1/30 sec. Switch $S_3$ has been provided for switching on the flash gun at the beginning of the action of the electronic switching device. However the flash bulb must not yet ignite. During switching on the switch $S_3$ connects the positive potential of the capacitor $C_1$ to the base of the transistor $T_1$ renders it conductive. At the same instant a current passes through the transistor $T_1$, which due to the voltage drop at the resistor $R_2$ produces a negative potential at the base of the transistor $T_2$. The latter has now also been rendered conductive (opened) and connects a voltage stabilized by the Zener diode Z to the conduit points A and B.

This switching-on operation of the actual control circuit via two switching transistors has the advantage that no particular significance need be paid to the kind of contact provided by the switch $S_3$. In some cameras the flash contact is closed only briefly (flip-contact), or is subject to bounce, as is often the case with cameras of a cheap design. If, however, switch $S_3$ is actuated, then after the flash gun has been switched on (current through the transistor $T_3$) the operating voltage of the transistor $T_1$ is the voltage drop across the resistor $R_5$ which is connected to the base of transistor $T_1$ via the lead D.

On account of the conduction of transistor $T_2$ a positive potential is connected to the base of the transistor $T_3$ via the resistor $R_3$; consequently the former also becomes conductive. As a result the electro-magnet 19 is energized. The armature 20 is attracted and thereby performs the actions referred to above, i.e. actuation of the two switches $S_1$ and $S_2$. Closing switch $S_1$ causes the flashbulb 6 to ignite and causes the capacitor $C_2$ previously charged when fitting the flashbulb 6 in the holder 5, to discharge. Opening of the switch $S_2$ cancels the short-circuit via the capacitor $C_3$. This permits it to be charged via the photo-electric resistor $R_4$. With the flashbulb 6 developing its full brightness, the object illuminated thereby reflects light rays on to the photo-electric resistor $R_4$ connected in the circuit of the electronic switching device, the resistance of which is lowered more or less in dependence upon the intensity of the illumination reflected by the object. The lower the ohmic value of the photo-electric resistor $R_4$, the sooner is the capacitor $C_3$ charged. The RC-network comprising $R_4$ and $C_3$, is so adjusted to the sensitivity of the film material used that the capacitor $C_3$ receives the potential necessary for making the transistor $T_4$ conductive at the instant at which the total light reflected by the object has just correctly exposed the film. When the transistor $T_4$ is now traversed by current (which at first is very small), the latter results in an increase of the voltage drop at the common emitter resistor $R_5$. This produces a base voltage at the resistor $R_3$ for the transistor $T_3$ hence begins to block. This operation is accumulative. As a result unblocking of transistor $T_4$ simultaneously causes the transistor $T_3$ to be blocked and hence the magnet 19 to be de-energized. The armature 20 is released and as described above releases the driving lever 13 via the catch spring 16, the opposed flaps 7 and 8 suddenly changing over from the open to the closed position, so that the light emitted to the subject by the flashbulb is cut off before termination of the actual period of lighting.

After cut-off of the flashbulb output the transistors $T_1$, $T_2$ and $T_4$ need not be switched on. This would only consume battery current unnecessarily. Moreover before making a new flash exposure it is necessary for the transistors $T_1$ and $T_2$ to be blocked, to permit the above-described switching-on operation to occur in dependence upon the closure of the flash contact switch $S_3$. Blocking of $T_1$ and $T_2$ may of course be effected purely electronically or by means of a mechanical switch. In the former case it is necessary for the emitter current of the transistor $T_4$ to be made so low that the voltage drop caused at the resistor $R_5$ is not sufficient in order, after switch $S_3$ opens, to keep the transistor $T_1$ conductive. If this is not possible, a mechanical "on" and "off" switch $S_4$ is required. This switch $S_4$ is conveniently arranged in the circuit of the battery E. It may be actuated by means of the flaps 7 and 8 or by the driving member 13 of the flash device in such a manner that, when the light screen is open, it is closed and during the closing operation thereof is opened.

When light emission to the subjeect is terminated, the flaps 7 and 8 remain closed for the time being. The photographer now has to actuate a member 22 mounted so as to be axially displaceable in the housing 1 of the flash gun, by means of which member the driving lever 13 is brought into the cocked position and which also ejects the used flashbulb 6. For this purpose the actuating member 22, as shown in FIG. 3, may be a press plunger which is mounted so as to be axially displaceable in the housing 1 biased by a spring 23. To actuate the driving lever 13 the press plunger 22 has an extension 22a, whilst for ejecting the used flashbulb 6 its front end is provided with a lifting edge 22b slanting up in the direction of movement. When the press plunger 22 is actuated, the extension 22a pushes the freely displaceable end of the driving lever 13 in front of it, while the lifting edge 22b forcibly pushes the socket of the flashbulb 6 out of the holder 5. When the driving lever 13 has reached its cocked position and hence the flaps 7 and 8 their open position, the catch spring 16 snaps into engagement behind the inclined edge 13a of the driving lever 13, whilst the supporting spring 17 assumes a securing position in front of the supporting edge 16b. This prepares the flash gun for the ignition of the next flashbulb. All that remains is to insert a new flashbulb in the holder of the flash gun.

As shown in FIGS. 11 to 14 the flash gun may also be equipped to receive a multiple flash, for example a flash cube denoted in the drawing by 25. This flash gun with regard to structure and function conforms fully with the embodiment as shown in FIG. 1 described above, for which reason in the drawing the individual components are provided with identical reference numerals, with a prime added thereto. Changes occur only in regard to the holder provided to receive the flash cube 25, and with respect to the construction of the driving lever 13' serving to move the light screen. Since the flash cube 25 needs to be ejected only after generating four flashes, it is also necessary to adapt the device used to return the driving lever 13' into the cocked position to the conditioning factors. The form of the driving lever 13' is shown in detail in FIGS. 12 to 14. These show that the lever has an additional arm 13b' which carries a pin 13c'. Return of the driving lever 13' is effected by turning the flash cube 25 through 90°. For this purpose a rotatably mounted switch plate 27 is arranged in the housing 1' of the flash gun, which plate is provided with a knurled edge 27a. On the switch plate a recess 27b shaped to the base of the flash cube 25 is formed, which receives the inserted flashbulb non-rotatably. The socket 25a of the flash cube 25 projects into the interior of the flash gun and thus in a manner not shown in detail, makes contact with the igniting circuit of the flash. The switch plate 27, rotatably mounted in the housing 1' to transfer the driving lever 13', is provided with a switching cam 27c, which is of the form shown in FIGS. 13 and 14 in chain-dotted lines. The cam shape could be different, since it is only important that the cam profile has several lifts emanating radially outwards from the pivot of the switch plate 27 and returning, in order to ensure that, when the switch plate is rotated through an angular range of 90°, the driving lever 13' is first transferred to its cocked position where it is locked. By suitable configuration of the switch cam 27c the pin 13c' receives enough freedom of movement to permit the driving lever 13' after being released by the stop, to swing freely out. As soon as one of the four bulbs of the flash cube 25 has ignited (the functional action in the flash conforming to that described above according to FIG. 1) the next bulb is brought into flash position by turning the switch plate 27 through 90°. The switch cam 27c of the switch plate 27 which is rotated therewith, on account of the quadripartite symmetrical shape, returns the driving lever 13' into the cocked position whilst simultaneously opening the flaps 7' and 8'.

FIGS. 7 to 10 and 15 to 17 show an embodiment of flash gun conforming in basic matters with the apparatus described above, the light screen of which however is not formed of opposing flaps but of a plurality of blades 30 arranged in louvre fashion and pivotally mounted. Components identical with the components of the embodiments already described are similarly numbered but are provided with two primes. The blades 30 are pivotally mounted in a portal-like frame 31 arranged in the housing 1" of the flash gun, and at one end the frame is provided with an extension projecting for reasons to be described in detail below into the interior of the housing. In place of the driving lever 13 or 13' described above, the present embodiment has a tensioning segment 32, which is mounted so as to be rotatable on a pin 33 in the housing 1". The cocking segment 32 has an arcuate member corresponding to the arrangement of the blades 30; this member is provided with a plurality of segment-shaped recesses 32a corresponding to the number of blades 30. Engaging in each recess is a tail 34, which is secured to and projecting laterally from the bearing projection of a blade 30, extending into the interior of the housing. Depending upon the position of the segment 32 the pivotal blades are opened to permit light to emerge (FIGS. 7, 8, 15 and 16) or closed (FIGS. 10 and 17). The segment 32 is provided with a cam 32b, in the region of the electro-magnetic stop 16 to 20, which cam like the inclined supporting edge 13a of the driving lever 13 or 13' in the cocked position is biased by the tension spring 15" and abuts against the catch spring 16. The tensioning segment 32, as shown by FIGS. 8 to 10 and 16 and 17, also has a switch $S_4$ associated therewith. This switch, which is connected in the battery circuit, is so actuated by the cocking segment that contact is made with the light screen open, and when the tensioning segment moves out of its normal position, contact is broken.

In the embodiment as shown in FIGS. 7 to 10, which is equipped to receive individual flashbulbs, an axially displaceable plunger 22" mounted in the housing is provided to move the tension segment into the tension position and for ejecting the used flashbulb 6. To permit an effective torque to be exerted on the tension segment 32 by means of the press plunger 22", a conical ramp 22a" is formed on the plunger, which during the pressing stroke acts on a pin 36 provided on the tension segment 32. To absorb the lateral pressure on the pressing plunger 22", the latter is supported in the region of an inclined lifting edge 22b" also formed thereon, in an additional guide 37. The press plunger 22" is returned by means of a spring 23", which engages with a collar of the plunger.

The embodiment shown in FIGS. 16 and 17 is equipped to receive flash cubes and therefore, in the same way as the flash gun shown in FIG. 11 is fitted with a switch plate 27". To give the rotary movement of the switch plate 27" necessary for the progressive transfer of the flash cube 25 to be effected when the tension segment 32 is moved into the cocked position, in the embodiment as shown in FIGS. 16 and 17 the plunger 22" is replaced by a traction rod 38 which at one end is hook-shaped, the hook engaging with the switching cam 27c" of the switch plate 27". When the switch plate 27" is rotated, the traction rod 38 is so moved that the conical shoulder 38a abuts against the pin 36 of the tension segment 32 and hence during the lifting movement exerts a torque on the segment in an anti-clockwise direction. No further comment on the tripping of the electro-magnetic stop 16 to 20 co-operating with the tension segment 32, is necessary here, since it conforms with the other embodiments described above.

As shown by the perspective views of the various embodiments of the flash gun, adjusting levers 42 and 43 are displaceably mounted on the housing 1 or 1' or 1" in slots 40 and 41. These levers serve the purpose of taking the sensitivity of the film material and the preselected aperture into account when carrying out exposures. The compensation is effected by connecting the adjusting levers 42 and 43 in the interior of the housing with means which, depending upon the position of adjustment, reduce the light passage to the photoelectric resistor $R_4$ to a greater or lesser extent. In the case of the adjusting lever 42 which is set to the film sensitivity scale 44, the means for reducing the light consists of a slit diaphragm 45 shown in FIG. 18, which is provided with a wedge-shaped opening 45a. The adjusting lever 43 co-operates with a diaphragm scale 46 marked on the outer wall of the housing. The lever is connected with a grey wedge 47 displaceably mounted in front of the photoelectric resistor $R_4$, also shown in FIG. 18.

The control circuit $T_3$, $T_4$ may be associated with a further additional switching stage which blocks the transistor $T_3$ independently of the photoelectric resistor $R_4$ after a certain period, the switching stage being such that the time period formed thereby is longer than the period of lighting of the flashbulb. This time interval may be assumed to be 50 to 60 ms. This additional switching stage comprises a parallel switch associated with the switch $S_2$ and a transistor $T_5$, and an additional RC-network with a capacitor $C_5$ and a variable resistor $R_6$. The object of the additional switching stage is, to close the screen in any case when the flash bulb is extinguished, independently of whether the photoelectric resistor $R_4$ circuit has closed the light screen or not. This is of considerable importance in the following cases:

(a) When the light emission of the flashbulb or the exposure range do not provide a properly exposed photograph, but would result in an under-exposure.

(b) When exposures are to be carried out by artificial light, in which hte time interval to the closing of the light screen is not to be regulated in dependence upon the lighting.

(c) When the blocking of the transistor $T_1$ is to be effected automatically after flash exposure.

Finally, FIG. 18 also shows that a selective setting member 49 adapted to occupy the setting positions "AUTO" AND "MAN" is associated with the photoelectric resistor $R_4$. This setting member, in the position "MAN," switches off the control effect of the photoelectric resistor $R_4$. For this purpose the setting member is connected with a cover slide 50, which in the position "MAN" is located in front of the photoelectric resistor $R_4$, but not when the member is in the position "AUTO." In place of a cover slide, electric means may be used in order to switch off the control of the photoelectric resistor $R_4$ in the position "MAN" of the setting lever.

We claim:

1. A flash gun for expendable flashbulbs for carrying out exposures in articficial light in conjunction with a photographic camera, comprising means for attaching said gun to camera, a socket for a flashbulb, a light screen with open and shut positions located between said flashbulb and an object to be photographed, cocking means for opening said screen before said flash bulb is ignited, a screen driving device, electronic control means for said driving device including a photoelectric variable resistor, a timing circuit associated with and actuated by said resistor, means for igniting said flashbulb and starting the operation of said timing circuit, and means for closing said screen after a time dependent on the amount of light reflected from said object and reaching said photoelectric resistor.

2. A flash gun as recited in claim 1, having a spring opposing the screen opening action of said driving device and an electro-magnetic catch for said driving member holding it in the open position, actuation of which catch by said timing circuit causes the driving device to restore the screen to a closed position, said driving member being formed as a pivotally mounted lever.

3. A flash gun as recited in claim 1, in which said light screen is formed of two oppositely displaceable flaps with means for actuating said flaps by said driving means.

4. A flash gun as recited in claim 3, in which each of said flaps is arranged on a pivotally mounted segment each segment having a pin and slot connection with said driving lever, each flap having also a curvature adapted to its path of movement.

5. A flash gun as recited in claim 1, in which said light screen consists of several louvre-like pivotally mounted blades.

6. A flash gun as recited in claim 5, in which said blades of the light screen are arranged in an arc, the driving lever causing their pivotal movement being formed as a spring-tensioned segment and provided with an arcuate part corresponding in shape to the blade locations, and a plurality of recesses equal to the number of blades, the latter having tails projecting laterally from them and, in operative engagement with said recesses.

7. A flash gun as recited in claim 2 wherein an actuating member is provided which simultaneously acts to eject a fired lamp and to move the lever driving the light screen into a cocked position.

8. A flash gun recited in claim 1 comprising a rotatable switch plate, a seating thereon for a multi-flash device, means for igniting the flashbulbs in said device in succession, a manually actuated means for rotating said switch plate, a switching cam on said plate, and means interconnecting said cam and a driving lever of said light screen, which means automatically transfers said driving lever during a switching operation into a cocked position.

9. A flash gun as recited in claim 8, in which said switching cam has a plurality of rises and falls equal in number to the switching operations required during one complete turn of said switch plate, said rises and falls extending radially outwards from a pivot of said switch plate and back again.

10. A flash gun as recited in claim 1, comprising a housing with a window, said photoelectric resistor being located in said window, and a regulatable light reducing device located between said resistor and said object.

11. A flash gun as recited in claim 10, in which said regulatable light reducing device is a graduated grey wedge filter.

12. A flash gun as recited in claim 10, in which said regulatable light reducing device is a screen with a tapered slot.

13. A flash gun as recited in claim 2, in which said catch retaining said driving lever of said light screen in the cocked position is formed as a stepped stop, means for releasing said stop by an armature of an electromagnet connected in the circuit of said electronic control means, and means for effecting said release in two successive switching stages caused respectively by attraction and release of the armature.

14. A flash gun as recited in claim 13 having a double switch located in the path of the magnet armature, said switch, when said armature is attracted, initiating both the charging of a capacitor determining the period of lighting of the object, and the ignition of the flashbulb.

15. A flash gun as recited in claim 1, in which said timing circuit of said electronic control means has an additional switching stage formed of an RC-network and a transistor, said stage being connected so as to act independently of said timing circuit to close said screen.

16. A flash gun as recited in claim 1, with a selective setting member adapted to be set either to a position "AUTO" or a position "MAN," and means for discontinuing said photoelectric resistor control in the latter position.

17. A flash gun as recited in claim 16, in which said means comprises a slider which covers the photoelectric resistor in the setting position "MAN," and means whereby said slider is moved by said selective setting member.

References Cited

UNITED STATES PATENTS

| | | | |
|---|---|---|---|
| 2,412,292 | 12/1946 | Schneider | 240—1.3 XR |
| 3,184,584 | 5/1965 | Bundschuh | 240—1.3 |
| 3,296,947 | 1/1967 | Engelsmann et al. | 95—11.5 XR |
| 3,312,086 | 4/1967 | Casebeer et al. | 240—1.3 XR |
| 3,386,360 | 6/1968 | Nerwin | 240—1.3 XR |

MORTON ANSHER, Primary Examiner

FRED L. BRAUN, Assistant Examiner

U.S. Cl. X.R.

95—11; 431—93